(12) United States Patent
Shand et al.

(10) Patent No.: US 12,296,630 B2
(45) Date of Patent: May 13, 2025

(54) NONPNEUMATIC TIRE

(71) Applicant: American Kenda Rubber Industrial Co., Ltd., Reynoldsburg, OH (US)

(72) Inventors: Claire Shand, Massillon, OH (US); Joseph Skibo, Jr., Cartersville, GA (US); Frank Johnson, Appling, GA (US); Daniel Davis, Kennesaw, GA (US)

(73) Assignee: American Kenda Rubber Industrial Co., Ltd., Reynoldsburg, OH (US)

( * ) Notice: Subject to any disclaimer, the term of this patent is extended or adjusted under 35 U.S.C. 154(b) by 500 days.

(21) Appl. No.: 17/855,960

(22) Filed: Jul. 1, 2022

(65) Prior Publication Data
US 2024/0001713 A1    Jan. 4, 2024

(51) Int. Cl.
*B60C 7/14* (2006.01)

(52) U.S. Cl.
CPC .................... *B60C 7/146* (2021.08)

(58) Field of Classification Search
CPC ........... B60C 7/146; B60C 7/18; B60C 7/107; B60C 7/143
USPC ............................................................. 152/5
See application file for complete search history.

(56) References Cited

U.S. PATENT DOCUMENTS 10,696,096 B2 *  6/2020  Van Riper ................ B60C 7/18

\* cited by examiner

*Primary Examiner* — S. Joseph Morano
*Assistant Examiner* — Eva L Comino
(74) *Attorney, Agent, or Firm* — Standley Law Group LLP; James L. Kwak; Adam J. Smith

(57) ABSTRACT

A nonpneumatic tire (NPT) having an inner ring for receiving a hub by which the nonpneumatic tire is affixed to a vehicle or other apparatus, an outer ring encircled by a tread band, and a plurality of revolved and mirrored spokes that extend between the inner ring and the outer ring to form an interconnected web of collapsible open cells. Each of the spokes includes multiple segments, with at least some of the segments having a concave bias when in an unloaded state. The design and arrangement of the spokes results in a nondirectional web, and loads experienced by the NPT are distributed throughout the web in a manner that increases the load carrying capacity of the NPT.

20 Claims, 12 Drawing Sheets

Known Web

Exemplary Inventive (New) Web

| Web Characteristics at 34mm Deflection | | |
|---|---|---|
| | Known Web | New Web |
| Reaction Force (N) | 3,796 | 4,751 |
| Load (kg) | 387 | 485 |
| Max Strain % | 13.1 | 13.54 |

Table 1: Deflection of 34mm on drum

*FIG. 9*

New Web

Known Web

| Webs Loaded at 1,150 lbs (522 kg) (Target Max Load) | | |
|---|---|---|
|  | Known Web | New Web |
| Max Strain % | 16.07 | 14.71 |
| Min Strain % | 17.25 | 14.98 |

Table 2: Load of 1,150 lbs. at highest strain point in rotation on flat road

FIG. 14

NONPNEUMATIC TIRE

TECHNICAL FIELD

Exemplary embodiments described herein are directed to a nonpneumatic tire with improved weight bearing and longevity characteristics.

BACKGROUND

An airless or nonpneumatic tire (NPT) does not rely on air or other gas pressure for support/rigidity. Rather, a NPT may be generally described as comprising a flexible structure that is trapped between an inner ring and an outer ring. The flexible structure functions to support the weight of the vehicle or other apparatus to which the NPT is installed, and may be provided in various forms such as individual spokes or an interconnected structure.

As would be understood by one of skill in the art, a ground-contacting tread layer is typically bonded or otherwise affixed to the outer ring of the NPT, while the inner ring is used to affix the NPT to a hub that facilitates mounting of the NPT to a vehicle or other apparatus.

NPTs may be found in diverse applications, such as but not limited to golf carts, lawn mowers, ATVs, and even passenger cars. The use of NPTs is growing in popularity relative to such applications due to desirable NPT characteristics such as damage and puncture resistance, especially when used on rough terrain. However, as the use of NPTs grows, there is an ongoing need for a NPT design that exhibits improved weight bearing and longevity characteristics in comparison to known NPT designs, while also being usable across both small and large applications and without sacrificing other desirable performance characteristics. The exemplary NPT embodiments shown and described herein meet this need.

SUMMARY

An exemplary nonpneumatic tire (NPT) according to the present invention comprises an inner ring and an outer ring between which is arranged a series of spokes that form an interconnected web of collapsible open cells. A tread band is molded, bonded or otherwise affixed to an outer surface of the outer ring and forms the ground-contacting portion of the NPT.

The web of open cells imparts support and rigidity to the NPT, while simultaneously exhibiting sufficient flexibility to provide for shock absorption and damage/puncture avoidance by permitting the NPT to deflect when encountering obstacles such as rocks or uneven terrain and to subsequently return to its original shape. The specific design of the web of a NPT according to the invention results in optimized strain distribution and improved load carrying capacity.

The optimized support web of an exemplary NPT according to the invention includes a multitude of generally Y-shaped spokes that are located between the inner and outer rings of the NPT and arrayed in a revolved fashion about its central axis. The terminus of the lower leg of each Y-shaped spoke is joined to the inner ring of the NPT, while the termini of the diverging upper legs of each of the Y-shaped spokes is joined to the outer ring. The termini of the diverging legs of a given Y-shaped spoke are also joined to the termini of like diverging legs of the spokes adjacent thereto.

The number of spokes in a given exemplary NPT may vary according to several factors. In any case, however, the design of the exemplary support web is non-directional in nature, which provides for several advantages. The design of the exemplary support web is also such that loads experienced by the associated NPT are distributed throughout the web, no portions of adjoining spokes come into contact during deflection of the web, and all of the spokes consistently bend in the same direction under loading, which prevents the material of the web from wearing prematurely.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 9 is a table presenting various web data associated with the loaded NPT webs of FIGS. 7-8;

FIG. 14 is a table presenting various web data associated with the loaded NPT webs of FIGS. 12-13.

DETAILED DESCRIPTION OF THE EXEMPLARY EMBODIMENTS

Figure 1:
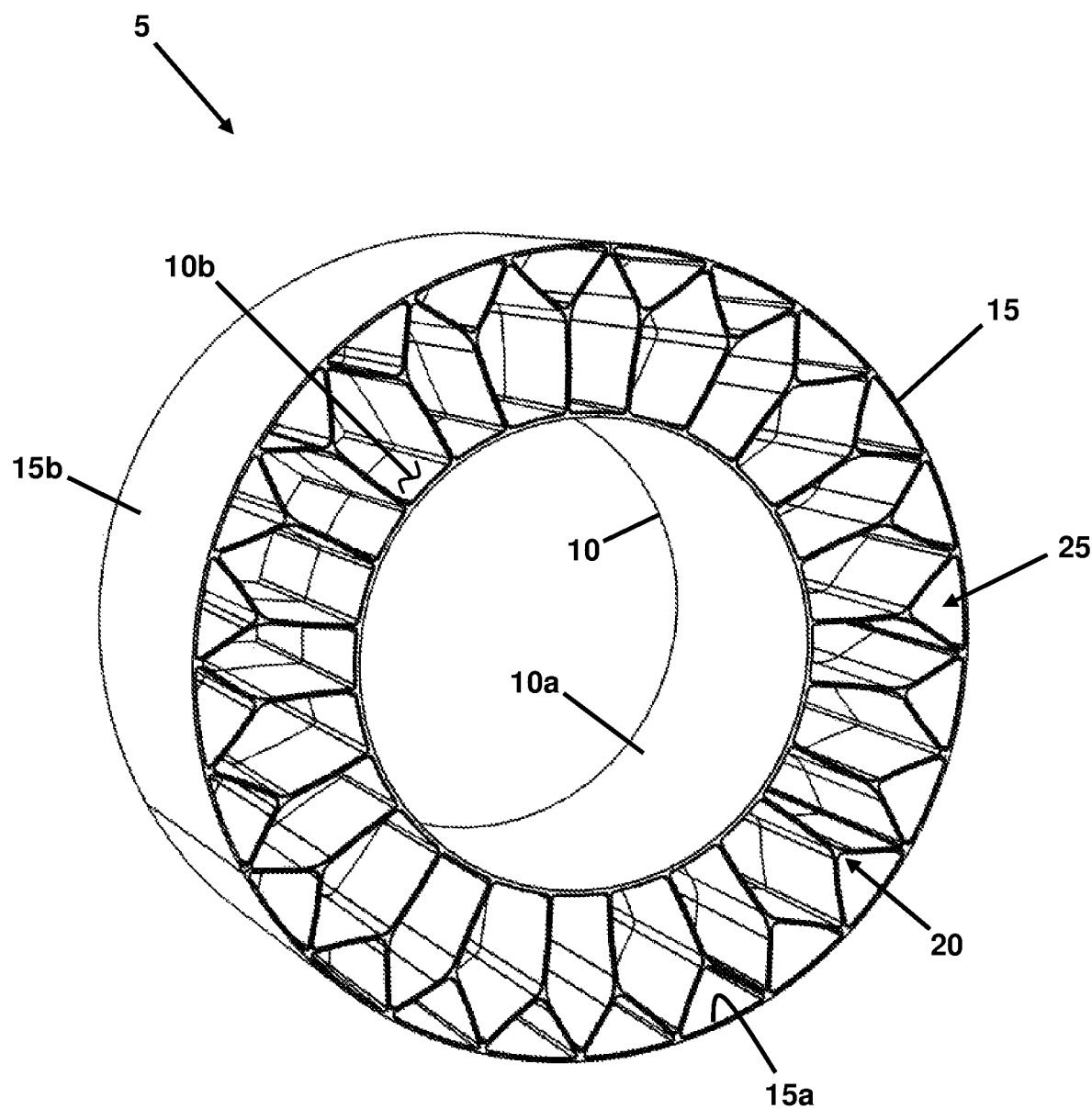
FIG. 1 is a perspective view of one exemplary embodiment of a nonpneumatic tire according to the present invention.
Figure 2:
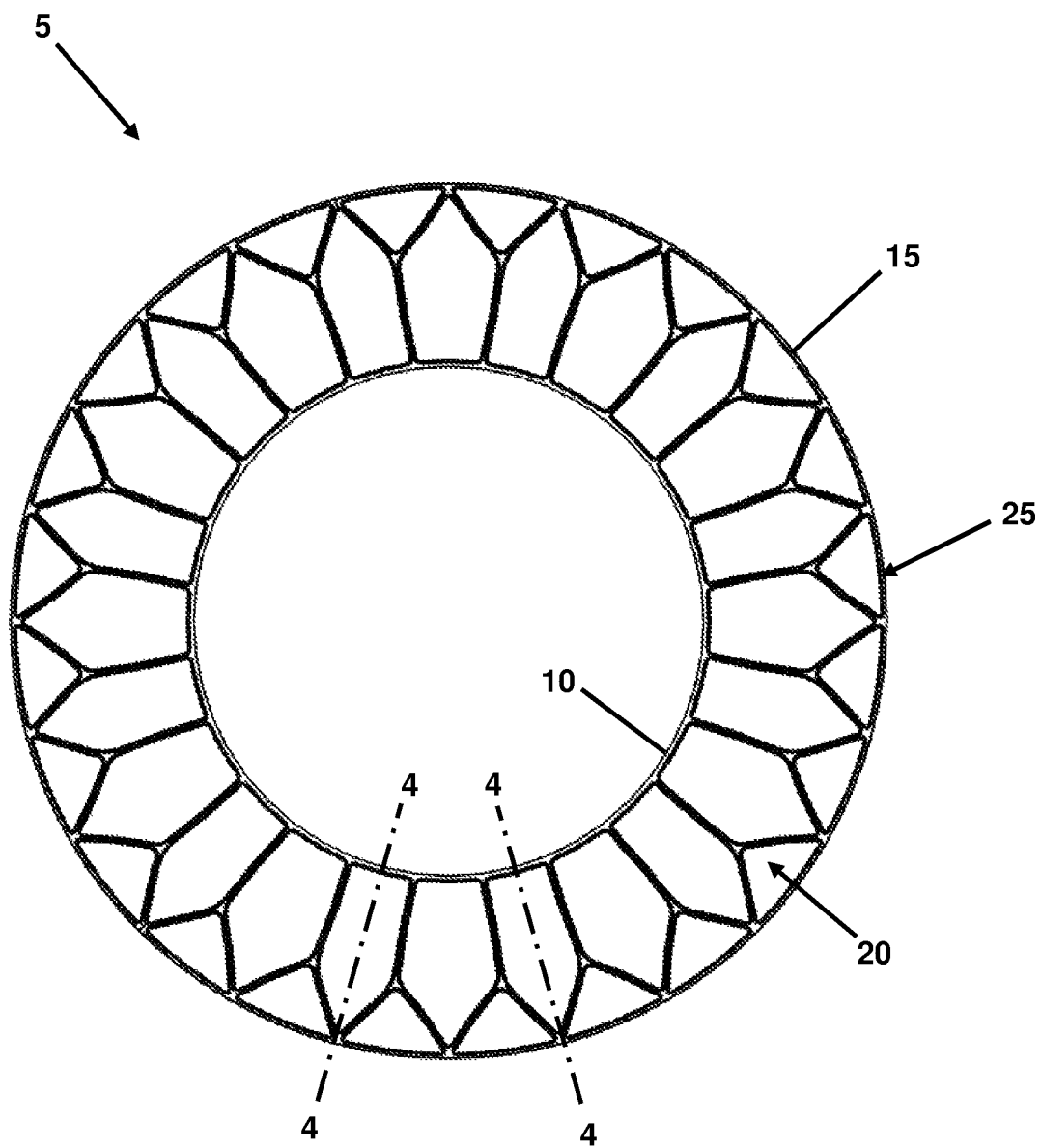
FIG. 2 is a side view of the exemplary nonpneumatic tire of FIG. 1.

One exemplary embodiment of a nonpneumatic tire (NPT) 5 according to the invention is depicted in FIGS. 1-2. As may be observed, the NPT 5 includes an inner ring 10 and an outer ring 15. The smaller diameter inner ring 10 is concentrically arranged within the larger diameter outer ring 15 such that a space exists therebetween. The inner ring 10 includes an inner face 10a and an outer face 10b. Similarly, the outer ring 15 includes an inner face 15*a* and an outer face 15*b*. The distance between the outer face 10*b* of the inner ring 10 and the inner face 15*a* of the outer ring 15 is referred to herein as the web radius.

While not shown here for purposes of clarity, the inner ring is designed to receive or otherwise be mounted by its inner face 10*a* to a hub that is in turn used to mount the NPT to a vehicle or other apparatus. Likewise, a tread band is normally bonded, molded or otherwise affixed in a wrapped-around fashion to the outer face 15*b* of the outer ring 15 to form the ground-contacting surface of the NPT 5. The tread pattern of the tread band may vary considerably based upon, for example, the intended use of a given NPT. Likewise, the thickness of the tread band may vary across different NPT embodiments, and may be comprised of a variety of materials. In one non-limiting embodiment, the tread band may include two layers of steel belts with a shear layer of material interposed therebetween.

Figure 3:
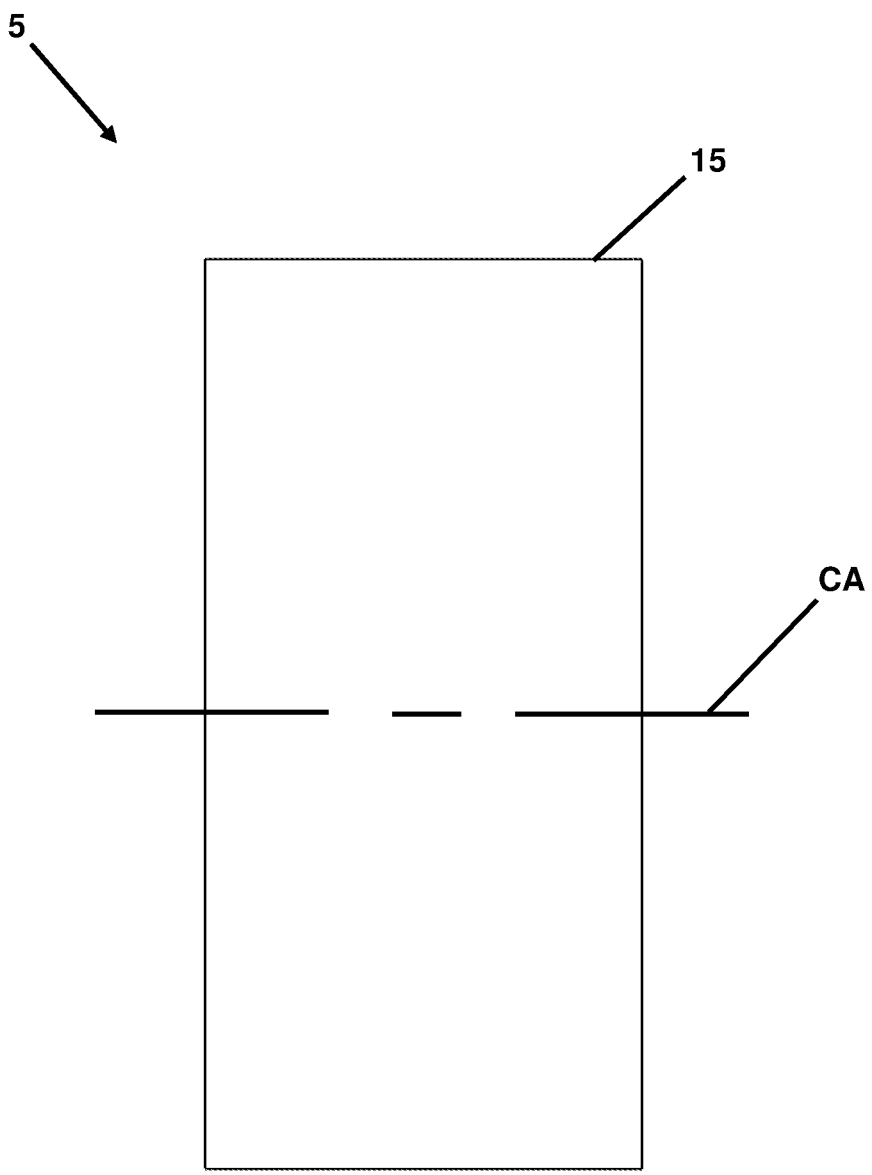
FIG. 3 is a front view of the exemplary nonpneumatic tire of FIGS. 1-2.

Arranged within the space between the inner ring 10 and the outer ring 15 is an array of substantially Y-shaped spokes 20 that are revolved around the central axis CA (see FIG. 3) of the NPT 5. Each spoke 20 extends between, and is connected to, the inner ring 10 and the outer ring 15. The collection of arrayed spokes 20 forms an interconnected web 25 of collapsible open cells. As explained in more detail below, the web 25 provides the support and rigidity necessary for the NPT 5 to function during operation and under loading.

Figure 4:
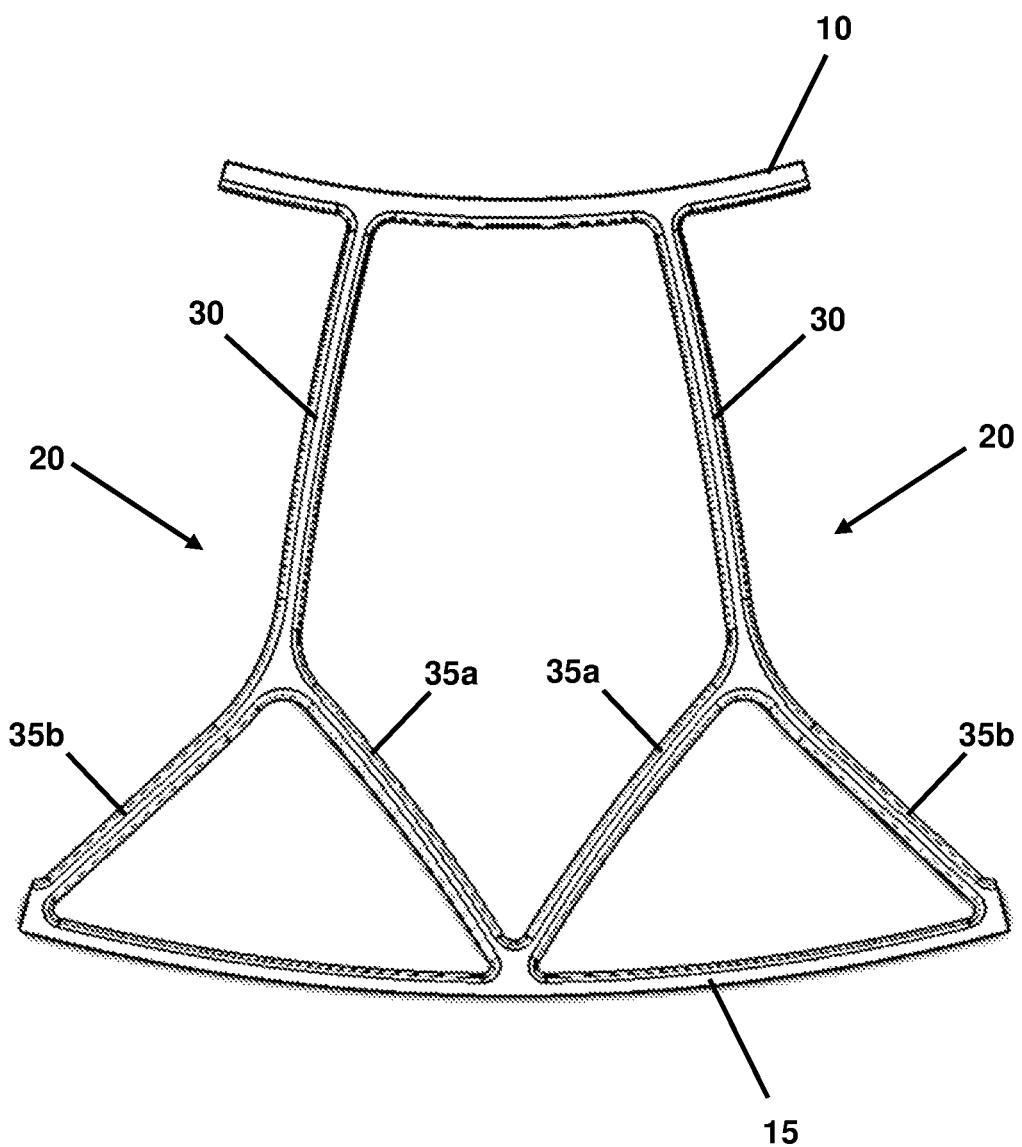
FIG. 4 is an enlarged view of a section of a web of the exemplary nonpneumatic tire of FIGS. 1-3, the section indicated by lines 4-4 in FIG. 2.
Figure 5:
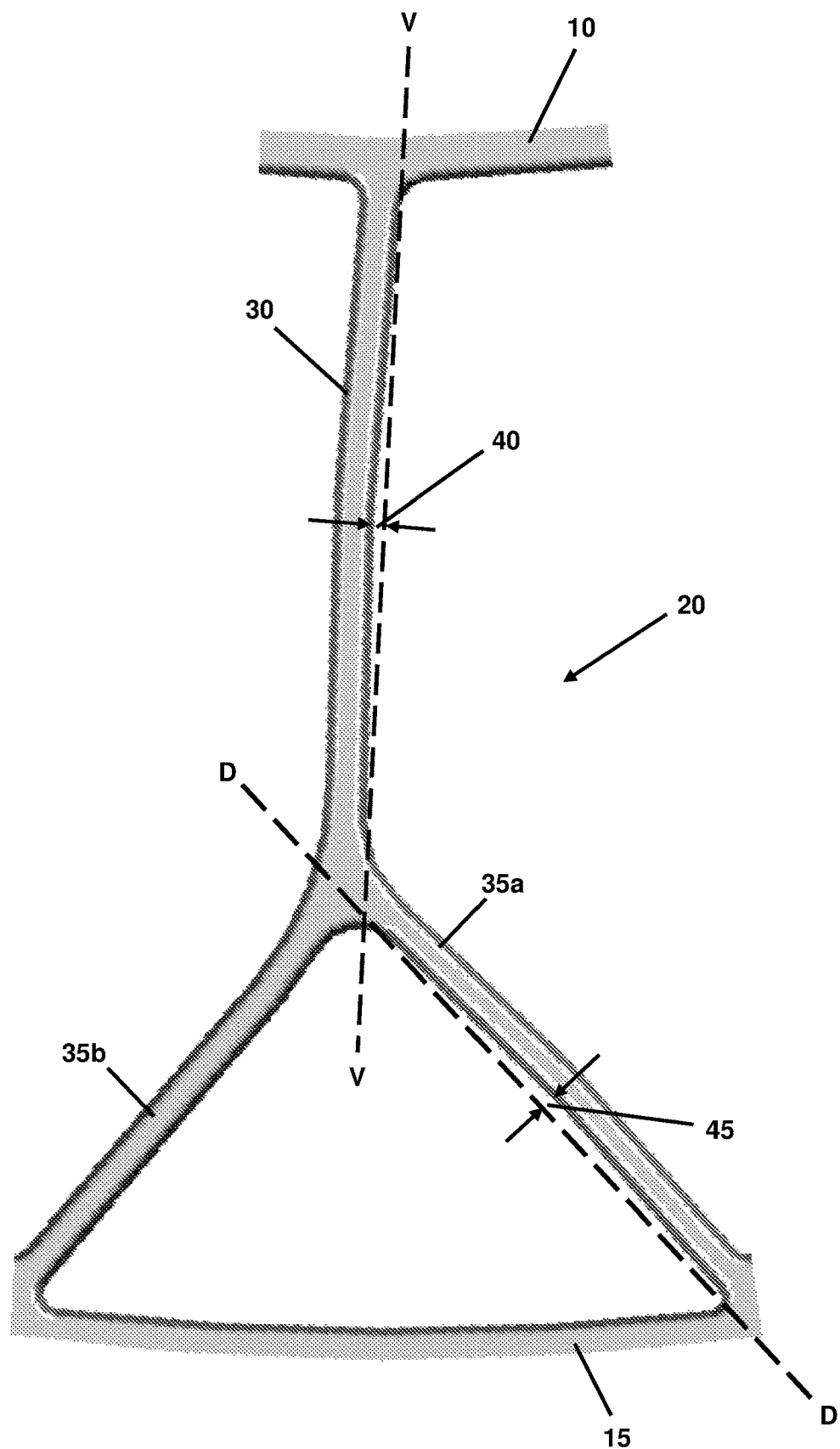
FIG. 5 is a further enlarged view of a spoke of the enlarged web section shown in FIG. 4.

Referring now also to FIGS. 4-5, certain additional design aspects of the spokes 20 may be better understood. As previously stated, each spoke 20 is generally Y-shaped, meaning that each spoke includes what will be referred to for purposes of description and differentiation as a lower leg 30 having a first end connected to the inner ring 10, as well as a pair of upper legs 35*a*, 35*b* that are coupled at respective first ends (and the vertex) thereof to a second end of the lower leg and extend therefrom in a diverging manner so as to connect at opposite second ends to the outer ring 15 and to the termini of like diverging upper legs of adjacent spokes. As such, each spoke 20 is coupled to and extends between the inner ring 10 and the outer ring 15 of the NPT 5, and adjacent spokes 20 form connected spoke pairs.

Various design parameters are preferably associated with each spoke of a support web present in an exemplary NPT according to the invention. For example, each of the spokes 20 of the web 25 of the exemplary NPT 5 shown and described herein preferably includes a lower leg 30 having a length that is between 60% and 65% of the distance between the outer face of the inner ring 10 and the inner face of the outer ring 15 (i.e., between 60% and 65% of the web radius). In this exemplary embodiment, the lower legs 30 of the individual spokes are also preferably connected to the inner ring 10 with substantially equidistant spacing therebetween, which results in the lower legs 30 of the individual spokes 20 being connected to the inner ring 10 at angular intervals of between 12° and 17°. Likewise, the two divergent upper legs 35*a*, 35*b* of each spoke 20 preferably form an angle of between 80° and 85° therebetween.

The above-described design parameters associated with the spokes 20 of the exemplary NPT 5 create a web 25 having twenty four individual spokes and twelve spoke pairs. However, it is possible for other exemplary NPT embodiments to utilize a lesser or greater number of spokes and spoke pairs. For example, and without limitation, the number of spokes of a given exemplary NPT may increase as the distance between the inner ring and the outer ring thereof decreases, and may decrease as the distance between the inner ring and the outer ring thereof increases.

The thickness of the spokes forming the web of an exemplary NPT according to the invention may also vary. For example, the spokes 20 forming the web 25 of the exemplary NPT 5 preferably exhibit a gradual reduction in thickness (taper) in an inner ring-to-outer ring direction, meaning that each spoke 20 is thicker near the inner ring 10 than near the outer ring 15. In this particular example, the thickness of each spoke 20 at the point where the lower leg 30 connects to the inner ring 10 is between 3.5 millimeters and 4 millimeters, but becomes gradually thinner when moving in the direction of the outer ring 15, such that the thickness of each spoke at the point where the divergent upper legs 35*a*, 35*b* connect to the outer ring is between 2 millimeters and 2.5 millimeters. In the exemplary embodiment of the NPT 5 presented herein, the thicknesses of the divergent legs 35*a*, 35*b* of a given spoke 20 are preferably substantially the same. The thickness ratio between the lower legs and the upper legs of the spokes of an exemplary NPT according to the invention contributes to proper deflection of the web during loading of the NPT.

By study of FIG. 5, it may be further understood that the legs 30, 35*a*, 35*b* of each spoke 20 have additional characteristics that result in an optimized web 25 having a better strain distribution and load carrying capacity than other NPT webs of which the inventors are aware. Particularly, while one of the divergent upper legs 35*b* of each spoke 20 is straight when in an unloaded state, the other divergent upper leg 35*a* and the lower leg 30 both possess a degree of curvature when in an unloaded state.

The intentional degree of curvature imparted to the lower leg 30 and the divergent upper leg 35*a* of each spoke, also referred to herein only for purposes of description as a concave bias, may be better observed in FIG. 5, which depicts a further enlargement of the unloaded leftmost spoke 20 of FIG. 4. For purposes of illustration and explanation, a reference line denoted as V-V has been added to FIG. 5 relative to the lower leg 30 of the spoke 20, and another reference line D-D has been similarly added relative to the concave-biased one of the divergent upper legs 35*a* of the spoke. Viewing the lower leg 30 of the spoke 20 in relation to straight reference line V-V better reveals the concave bias present in the unloaded lower leg. Likewise, viewing the divergent upper leg 35*a* of the spoke 20 in relation to straight reference line D-D reveals the concave bias present in the unloaded divergent upper leg.

The amount of the curvature/concave bias present in the lower leg 30 of the spoke 20 is represented by the distance between the approximate midpoint of the lower leg and straight line V-V. This distance/bias is illustrated in FIG. 5 as the space between the associated arrows and indicated by reference number 40. Similarly, the amount of the curvature/ concave bias present in the divergent upper leg 35*a* of the spoke 20 is represented by the distance between the approximate midpoint of the curved divergent upper leg 35*a* and straight line D-D. This distance/bias is illustrated in FIG. 5 as the space between the associated arrows and indicated by reference number 45. The spaces 40, 45 and associated arrows indicate the location of peak curvature/concave bias of the lower leg 30 and the curved divergent upper leg 35*a* and represent the maximum deviation of each of the lower leg and the curved divergent upper leg from a straight line (straight configuration). While the amount of concave bias imparted to the lower leg and the curved divergent upper leg of an exemplary spoke may vary across different NPT embodiments according to the invention, the amount of concave bias 40 present in the lower leg 30 and the amount of concave bias present in the curved divergent upper leg 35a of each spoke 20 of the exemplary NPT 5 is preferably between 1 to 2 millimeters.

Referring again to FIGS. 1-2 and FIG. 4, it may also be observed that the spokes 20 forming the web 25 of the exemplary NPT 5 are arrayed in a mirrored fashion. That is, as the spokes 20 are revolved around the central axis CA of the NPT 5, adjacent spokes are a mirror image of each other. This results in a given spoke 20 having, along one side, its straight divergent upper leg 35b connected to the straight divergent upper leg 35b of a first adjacent spoke, and on the other side, its concave-biased divergent upper leg 35a connected to the concave-biased divergent upper leg 35a of a second adjacent spoke. As may be best observed in FIGS. 1-2, this mirrored pattern and interconnectivity of adjacent spokes repeats over the entirety of the web 25.

As shown in FIG. 4, the mirrored arrangement of the spokes 20 of the exemplary NPT 5 also results in the lower legs 30 of adjacent spokes having a curvature that is directed away from the concave-biased divergent upper legs 35a and toward the straight divergent upper legs 35b. Likewise, the mirrored arrangement of the spokes 20 results in the concave-biased divergent upper legs 35a of adjacent spokes having a curvature that is directed toward each other (i.e., the divergent upper legs 35a of adjacent spokes are biased toward each other). As explained in more detail below, this mirrored arrangement, interconnectivity, and concave bias of the spokes 20 and the segments thereof results in improved performance of the web 25 and imparts the NPT 5 with other desirable and beneficial characteristics.

One benefit of the mirrored and interconnected arrangement of spokes 20 is the nondirectional nature of the resulting web 25. This allows the web 25 of spokes 20 to provide the same level of support and rigidity regardless of the direction of rotation of the NPT 5. The nondirectional nature of the web 25 of spokes 20 also allows the NPT 5 to be mounted on either side of a vehicle or other apparatus, unlike directional NPTs or directional pneumatic tires. The nondirectional nature of the web 25 of spokes 20 also enhances the manufacturability of the NPT 5.

Figure 6:
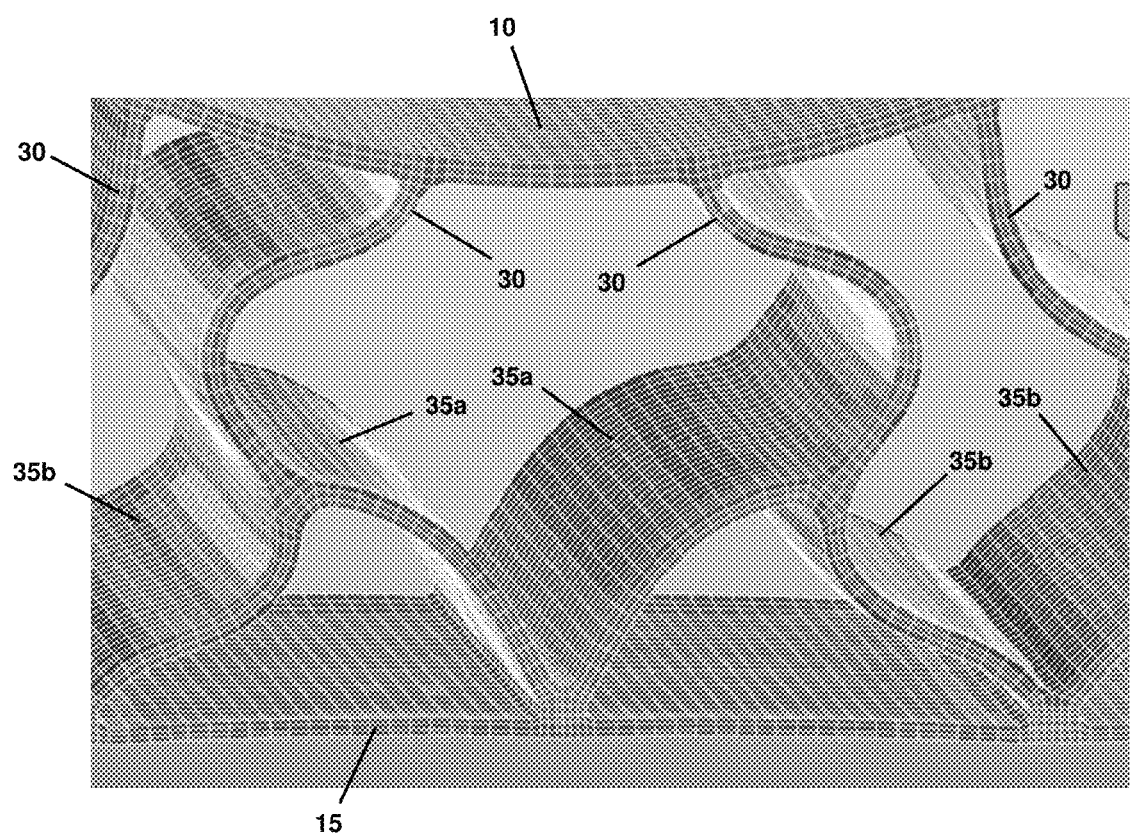
FIG. 6 is an enlarged view of a section of the web of the exemplary nonpneumatic tire of FIGS. 1-3 when subjected to a deflecting load.

FIG. 6 is an enlarged section of the web 25 of the exemplary NPT 5. FIG. 6 particularly illustrates the behavior of the spokes 20 of the web 25 when the NPT 5 is subjected to loading, which is another benefit of the inventive design.

As may be observed in FIG. 6, when the NPT 5 is subjected to a sufficiently large load, the spokes 20 flex (deflect) in the direction of the biased lower legs 30. More specifically, the concave bias of the lower legs 30 and the curved divergent upper legs 35a of the spokes 20 causes the lower legs 30 to deflect outward in the direction of the bias therein, and the curved divergent upper legs 35a of adjacent spokes to deflect inward towards each other. This pattern of deflection allows the divergent upper legs 35a of the spokes 20 to bear more of the load placed on the NPT, which relieves the strain applied to the lower legs 30 and to the straight divergent upper legs 35b of the spokes. As a result, the straight divergent upper legs 35b of the spokes 20 are better able to help maintain the structure of the web 25 during deflection. Further, because the spokes 20 consistently bend in the same direction during deflection of the web 25, the spokes do not contact one another and premature wear of web is avoided.

Figure 7:
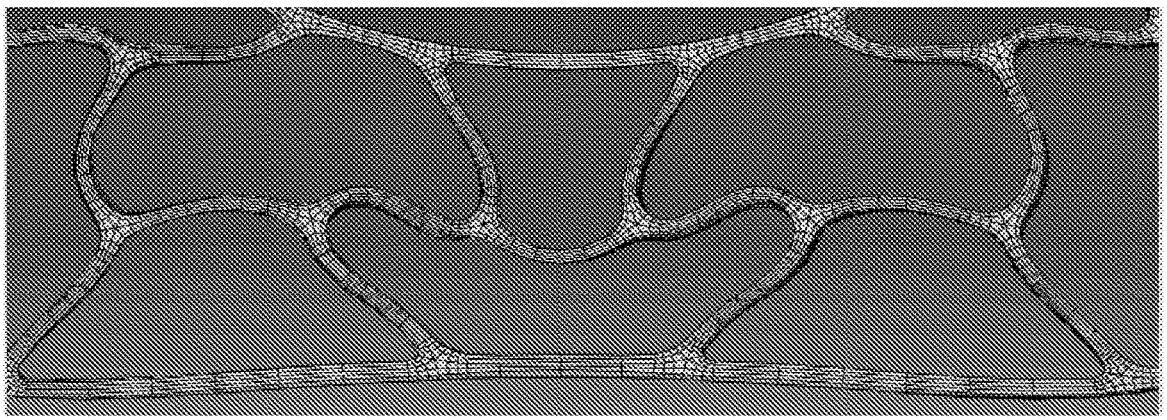
FIG. 7 illustrates the deflection of a known NPT web under certain loading conditions.
Figure 8:
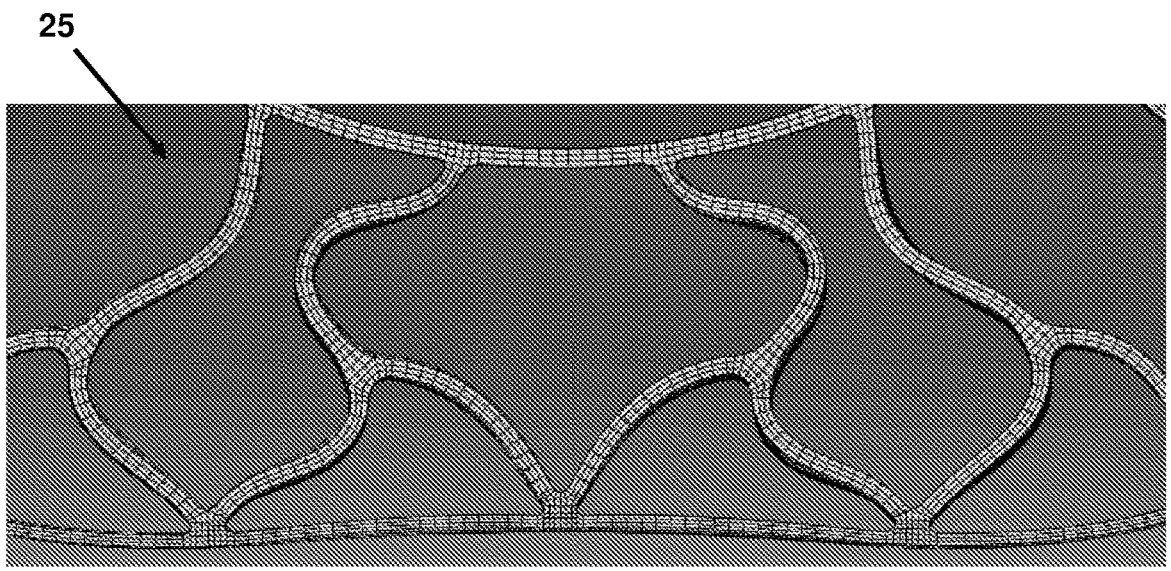
FIG. 8 illustrates the deflection of an exemplary NPT web according to the invention under the same loading conditions as the known NPT web of FIG. 7.

Referring now to FIGS. 7-14, it may be observed that the design of the spokes 20 and the above-described pattern of spoke deflection produces an optimized distribution of a load applied to the web 25 of the NPT 5, thereby resulting in improved load carrying performance in comparison to known NPTs of which the inventors are aware. In this regard, FIG. 7 illustrates a known NPT web, and FIG. 8 illustrates the web 25 of the exemplary NPT 5, when each web is deflected by approximately 34 millimeters under a test load. Both the known web represented in FIG. 7 and the web 25 of the exemplary NPT 5 represented in FIG. 8 are constructed from the same material.

In addition to the obvious improvement in overall deflection exhibited by the web 25 of the exemplary NPT 5 when comparing FIG. 8 to FIG. 7, it may also be observed from Table 1 of FIG. 9 that a load of 485 kilograms was required to produce a 34 millimeter deflection of the web 25 of the exemplary NPT 5, while a 34 millimeter deflection of the known web was produced by a lesser load of only 387 kilograms. Further, the web 25 of the exemplary NPT 5 produces a greater reaction force than the known web (4,751 N versus 3,796 N) when the webs are equally deflected, while exhibiting only a slightly greater strain value (due primarily to a higher load capacity). Consequently, the web 25 of the exemplary NPT 5 is shown herein to support a 25% greater load than can be supported by the known web while exhibiting a similar amount of strain.

Figure 11:
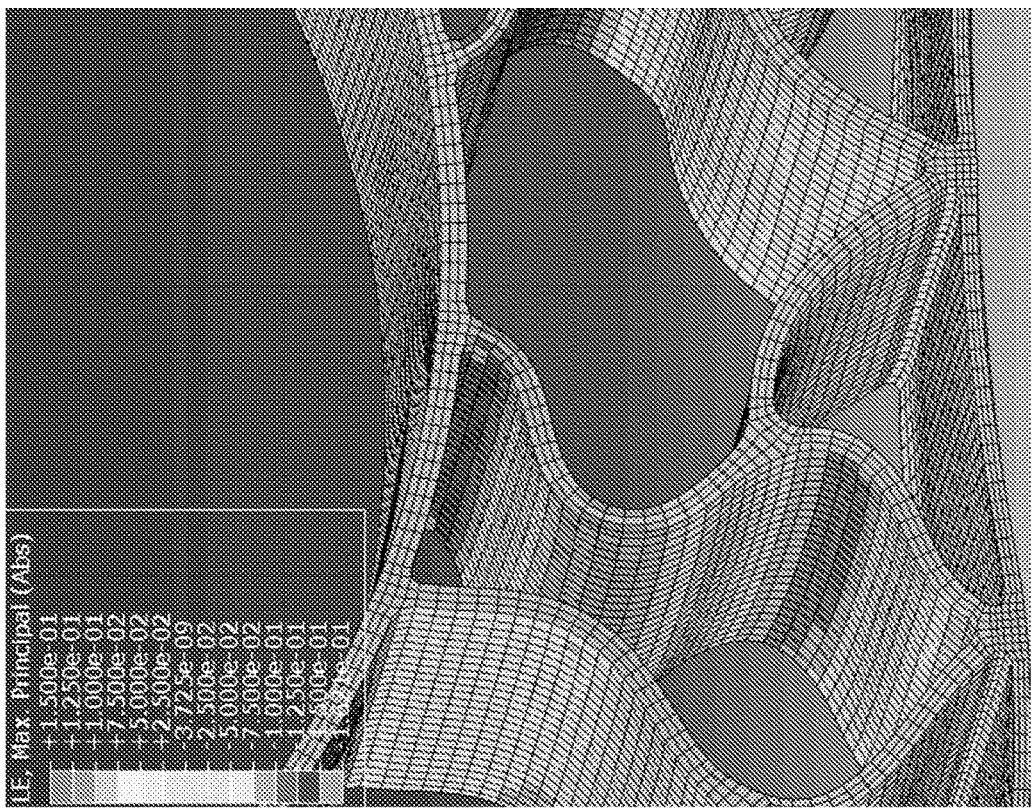
FIG. 11 represents the results of a finite elements analysis of the deflection of an exemplary NPT web according to the invention under the same loading conditions as the known NPT web of FIG. 10.
Figure 10:
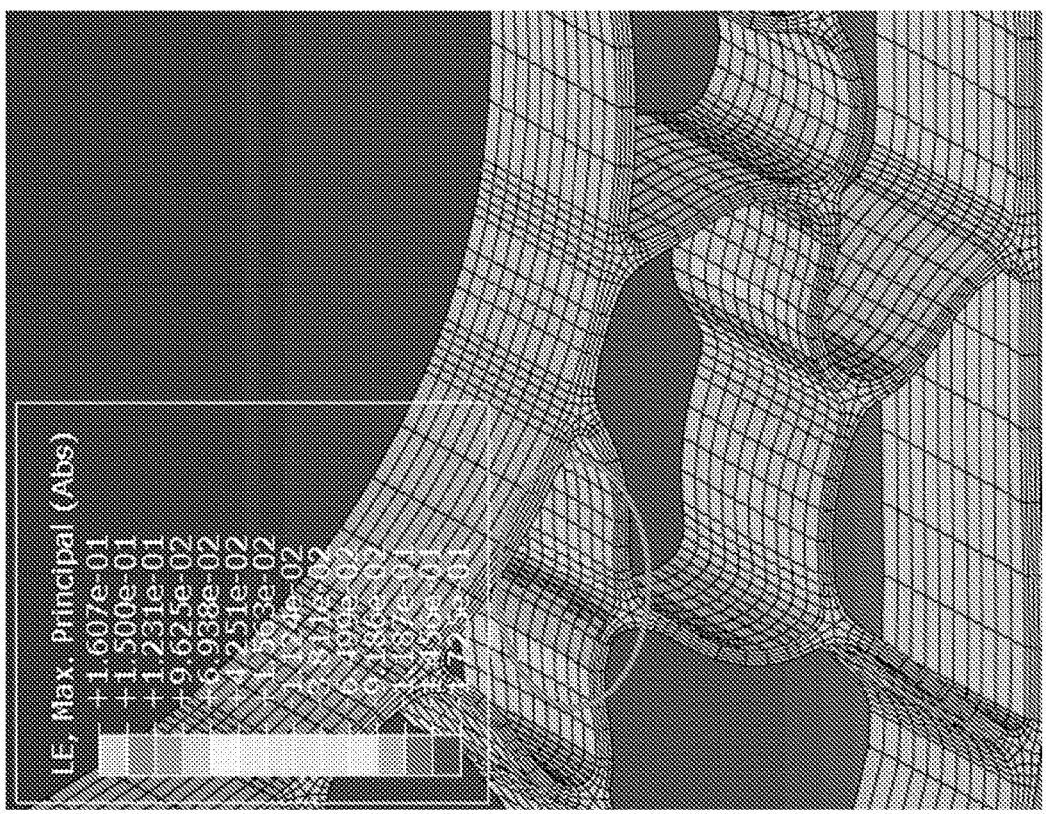
FIG. 10 represents the results of a finite elements analysis of the deflection of a known NPT web under certain loading conditions.

Referring to FIGS. 10-11, it may be observed that when the load on the known web and the web 25 of the exemplary NPT 5 is increased to 1,150 pounds (approximately 522 kilograms), the web 25 of the exemplary NPT 5 exhibits superior strain characteristics. For example, under the increased 1,150 pound load, the maximum strain value exhibited by the deflected web 25 of the exemplary NPT 5 is below the 15% maximum strain value where the yield point of the material from which the exemplary web 25 and the known web are both constructed is reached and the material begins to permanently deform. In contrast, the deflected known web exhibits a maximum strain value greater than the aforesaid 15% maximum strain value—particularly in the common area of failure indicated by the ellipse in FIG. 10—indicating the possibility of an undesirable permanent deformation of the known web at that location.

Figure 12:
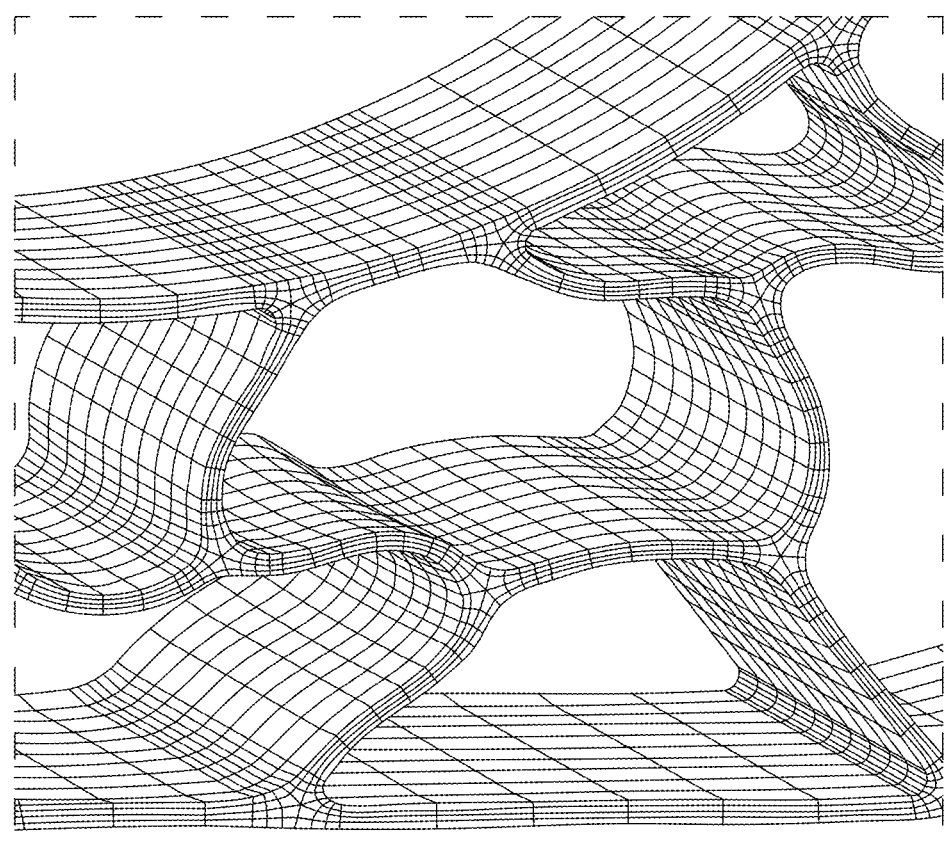
FIG. 12 represents the results of a finite elements analysis of the reaction of a known NPT web to certain rotational loading conditions.
Figure 13:
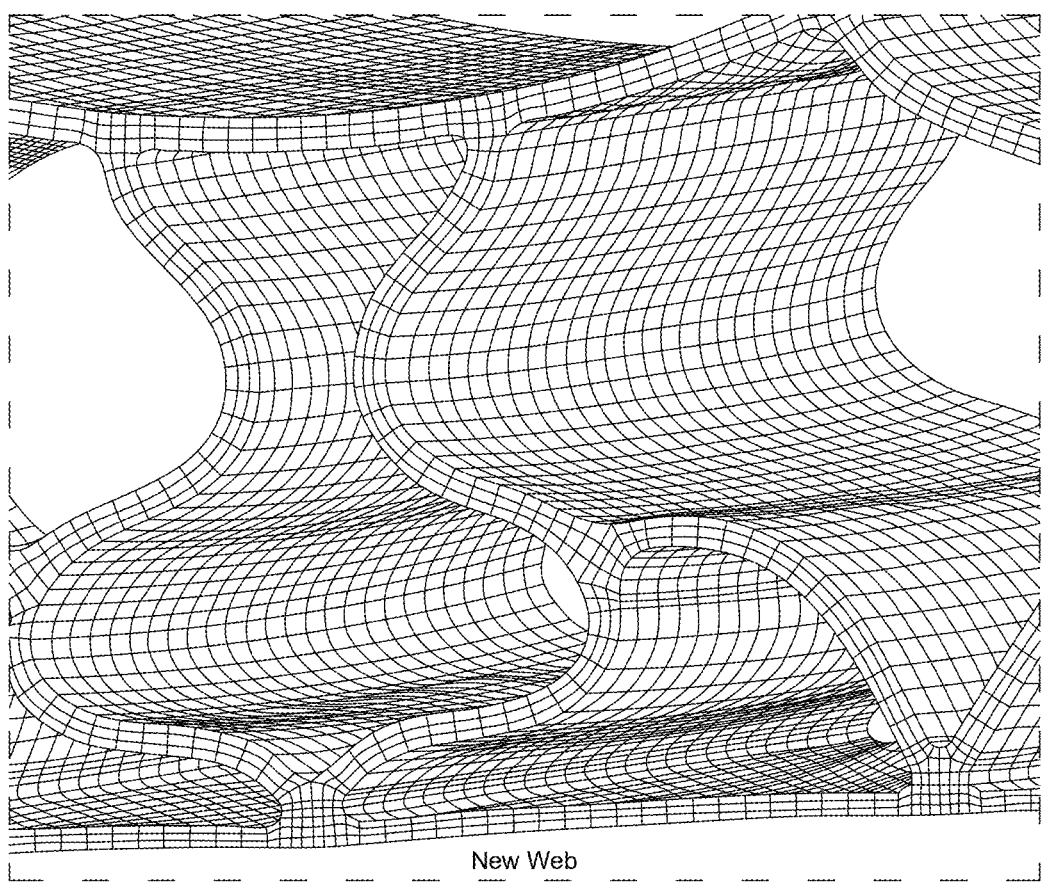
FIG. 13 represents the results of a finite elements analysis of the reaction of an exemplary NPT web according to the invention under the same rotational loading conditions as the known NPT web of FIG. 12.

The reaction of the web 25 of the exemplary NPT 5 and the known web to dynamic (rotational) loading under the same deflection conditions as shown in FIGS. 10-11 is represented by the finite element analysis (FEA) renderings of FIGS. 12-13. Particularly, the FEA renderings of FIGS. 12-13 represent the web reactions to a load of 1,150 pounds (approximately 522 kilograms) at the maximum value of strain during rotation of the webs on a flat road. As can be observed in FIG. 12 and from corresponding Table 2 of FIG. 14, under said loading conditions, the known web exhibits consistently high strain values at the most common area of failure (indicated by the ellipse in FIG. 12). In fact, it may be understood from Table 2 that the known web exhibits a maximum strain value that exceeds the yield point of the material from which the known web and the web 25 of the exemplary NPT 5 are both constructed. It is also noted that rotational analysis of the known web could not be completed due to excessive buckling of the know web under the stated loading conditions.

In contrast to the known web, it may be observed from FIGS. 13-14 that under the same loading conditions, the maximum strain exhibited by the web 25 of the exemplary NPT 5 never reaches the 15% maximum strain value—meaning that the yield point of the material from which the exemplary web 25 is constructed is never reached and the web 25 does not experience any permanent deformation.

It is contemplated that the spokes and the resulting web of a NPT according to the invention will be comprised of a plastic material, and the known web and the exemplary web described herein for purposes of comparison are comprised of a plastic material. However, it is to be understood that the scope of the invention is not limited to any specific material, and other materials may be used as long as said materials provide an acceptable amount of rigidity, flexibility, etc., when a web is formed therefrom.

It should also be understood that while the spokes of an exemplary NPT are described herein as having a lower leg and upper legs that are "connected" or otherwise coupled to one another, as well as connected or otherwise coupled respectively to an inner ring and an outer ring, it is most likely that the various portions of the spokes and the inner and outer rings of an exemplary NPT will all be part of a unitary molded structure.

As used herein, the term "lower" is intended only to identify the portion of a given spoke that is connected to the inner ring of an exemplary NPT and to differentiate that portion of the spoke from other portions thereof.

As used herein, the term "upper" is intended only to identify the portion of a given spoke that is connected to the outer ring of an exemplary NPT and to differentiate that portion of the spoke from other portions thereof.

As used herein, the term "central axis" is intended to refer to the symmetrical axis of a NPT.

As used herein "first" and "second" are intended only to differentiate between two sides of a given spoke, and not to indicate an order, a preference, or superiority or inferiority, of any kind.

While certain embodiments of the invention are described in detail above, the scope of the invention is not considered limited by such disclosure, and modifications are possible without departing from the spirit of the invention as evidenced by the following claims:

What is claimed is:

1. A nonpneumatic tire, comprising:
   an outer ring;
   a tread band affixed to an outer face of the outer ring and including a ground-contacting surface;
   an inner ring concentrically arranged within the outer ring about a common central axis and within a space therebetween; and
   a plurality of flexible spokes residing within the space and forming a web that connects the inner ring and the outer ring, wherein:
   each spoke includes a single lower leg connected at a first end thereof to the outer face of the inner ring, and a pair of upper legs that are both coupled at respective first ends to a second end of the lower leg, the upper legs extending outward in a diverging fashion and connected at opposite second ends thereof to the inner face of the outer ring,
   the lower leg of each spoke has a degree of curvature when in an unloaded state,
   one of the diverging upper legs of each spoke has a degree of curvature when in an unloaded state, while the other diverging leg is straight, and
   the spokes are revolved around the central axis in a mirrored fashion such that, along one side of a given spoke the second end of the curved diverging leg is further connected to the curved diverging leg of a first adjacent spoke, and along the opposite side of the given spoke the straight diverging leg is further connected to the straight diverging leg of a second adjacent spoke, so as to form a plurality of connected spoke pairs.

2. The nonpneumatic tire of claim 1, wherein the lower leg of each spoke has a length that is between 60% and 65% of the web radius.

3. The nonpneumatic tire of claim 1, wherein the lower legs of the spokes are connected to the inner ring at angular intervals of between 12° and 17°.

4. The nonpneumatic tire of claim 1, wherein the lower legs of the spokes are connected to the inner ring with equidistant angular spacing therebetween.

5. The nonpneumatic tire of claim 1, wherein the angle between the divergent upper legs of each spoke is between 80° and 85°.

6. The nonpneumatic tire of claim 1, wherein the thickness of each spoke becomes gradually less along an inner ring-to-outer ring direction.

7. The nonpneumatic tire of claim 6, wherein the thickness of each spoke at the point where the lower leg connects to the inner ring is between 3.5 millimeters and 4 millimeters, and the thickness of each spoke at the point where the divergent upper legs connect to the outer ring is between 2 millimeters and 2.5 millimeters.

8. The nonpneumatic tire of claim 1, wherein the thicknesses of the divergent upper legs of a given spoke are substantially the same.

9. The nonpneumatic tire of claim 1, wherein:
   the peak amount of curvature present in the lower leg of each spoke is between 1 millimeter and 2 millimeters relative to a straight line; and
   the peak amount of curvature present in the curved divergent upper leg of each spoke is between 1 millimeter and 2 millimeters relative to a straight line.

10. The nonpneumatic tire of claim 1, wherein upon a deflection of the web under loading, the lower legs and the curved divergent upper legs of the spokes will bend in the direction of the curvature present therein, such that the curved divergent upper legs of adjacent spokes will bend inward towards each other.

11. The nonpneumatic tire of claim 1, wherein the spokes will consistently bend in the same direction during deflection of the web.

12. The nonpneumatic tire of claim 1, wherein the web comprises twenty four individual spokes and twelve spoke pairs.

13. A nonpneumatic tire assembly, comprising:
   an outer ring;
   a tread band affixed to an outer face of the outer ring and including a ground-contacting surface;
   an inner ring concentrically arranged within the outer ring about a common central axis and within a space therebetween;
   a mounting hub located within the space of the inner ring and secured to an inner face thereof, the hub configured to mount the nonpneumatic tire to a vehicle; and
   a plurality of flexible spokes residing within the space and forming a web that connects the inner ring and the outer ring, wherein:
   each spoke includes a single lower leg connected at a first end thereof to the outer face of the inner ring, and a pair of upper legs that are both coupled at respective first ends to a second end of the lower leg, the upper legs extending outward in a diverging fashion and connected at opposite second ends thereof to the inner face of the outer ring,
   the lower leg of each spoke has a degree of curvature when in an unloaded state, one of the diverging upper legs of each spoke has a degree of curvature when in an unloaded state, while the other diverging leg is straight, and the spokes are revolved around the central axis in a mirrored fashion such that, along one side of a given spoke, the second end of the curved diverging leg is further connected to the curved diverging leg of a first adjacent spoke, and along the opposite side of the given spoke, the straight diverging leg is connected to the straight diverging leg of a second adjacent spoke, so as to form a plurality of connected spoke pairs.

14. The nonpneumatic tire assembly of claim 13, wherein:
the lower leg of each spoke has a length that is between 60% and 65% of the web radius;
the lower legs of the spokes are connected to the inner ring at angular intervals of between 12° and 17°;
the angle between the divergent upper legs of each spoke is between 80° and 85°; and
the thickness of each spoke becomes gradually less along an inner ring-to-outer ring direction.

15. The nonpneumatic tire assembly of claim 14, wherein the thickness of each spoke at the point where the lower leg connects to the inner ring is between 3.5 millimeters and 4 millimeters, and the thickness of each spoke at the point where the divergent upper legs connect to the outer ring is between 2 millimeters and 2.5 millimeters.

16. The nonpneumatic tire assembly of claim 13, wherein:
the peak amount of curvature present in the lower leg of each spoke is between 1 millimeter and 2 millimeters relative to a straight line; and
the peak amount of curvature present in the curved divergent upper leg of each spoke is between 1 millimeter and 2 millimeters relative to a straight line.

17. A support web for a nonpneumatic tire, comprising:
a plurality of flexible spokes revolved around a central axis and forming an interconnected web of collapsible open cells, wherein:
each spoke includes a single lower leg having a first end and a second end, and a pair of upper legs that are both coupled at respective first ends to the second end of the lower leg, the upper legs extending outward in a diverging fashion therefrom,
the lower leg of each spoke has a degree of curvature when in an unloaded state,
one of the diverging upper legs of each spoke has a degree of curvature when in an unloaded state, while the other diverging leg is straight, and
the spokes are revolved around the central axis in a mirrored fashion such that, along one side of a given spoke, the second end of the curved diverging leg is connected to the curved diverging leg of a first adjacent spoke, and along the opposite side of the given spoke, the straight diverging leg is connected to the straight diverging leg of a second adjacent spoke.

18. The nonpneumatic tire support web of claim 17, wherein:
the lower leg of each spoke has a length that is between 60% and 65% of the total length of the spoke;
the spokes are revolved about the central axis such that the lower legs of the spokes are distributed at angular intervals of between 12° and 17°;
the angle between the divergent upper legs of each spoke is between 80° and 85°; and
the thickness of each spoke becomes gradually less along an inner ring-to-outer ring direction.

19. The nonpneumatic tire support web of claim 18, wherein the thickness of each spoke at the point where the lower leg connects to the inner ring is between 3.5 millimeters and 4 millimeters, and the thickness of each spoke at the point where the divergent upper legs connect to the outer ring is between 2 millimeters and 2.5 millimeters.

20. The nonpneumatic tire support web of claim 17, wherein:
the peak amount of curvature present in the lower leg of each spoke is between 1 millimeter and 2 millimeters relative to a straight line; and
the peak amount of curvature present in the curved divergent upper leg of each spoke is between 1 millimeter and 2 millimeters relative to a straight line.

* * * * *